Feb. 10, 1931.  V. LUIS  1,792,022
ELECTRIC MOTOR
Filed July 23, 1928
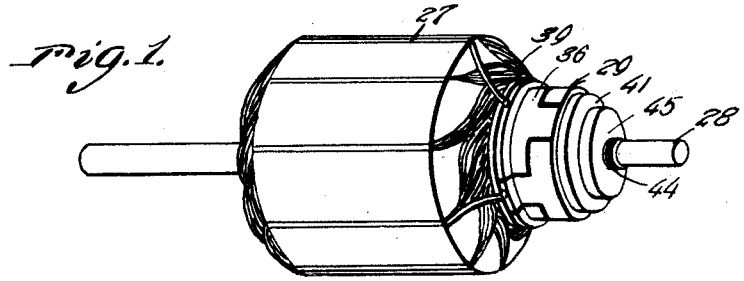
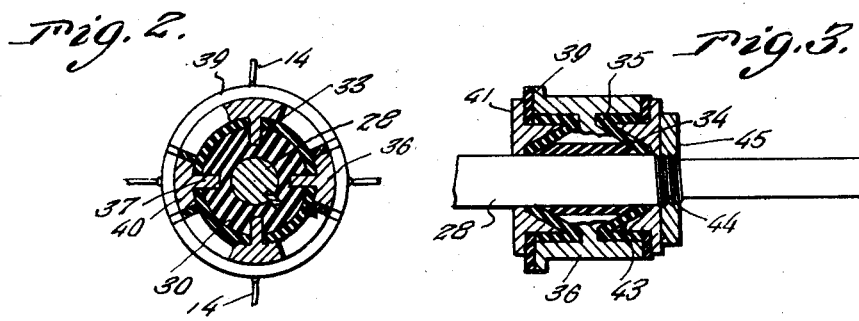
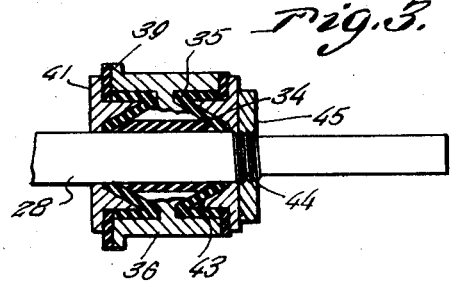
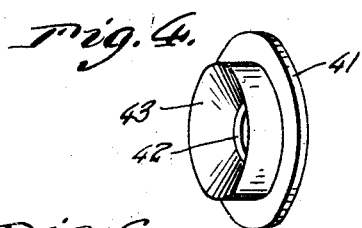
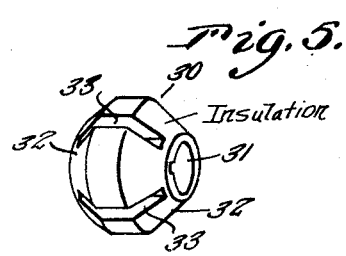
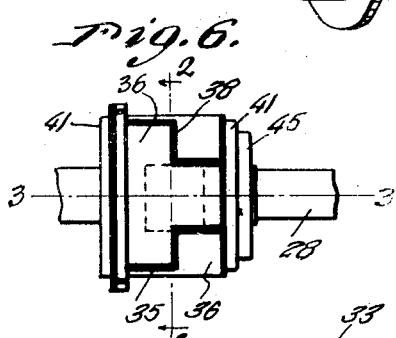
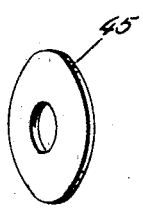
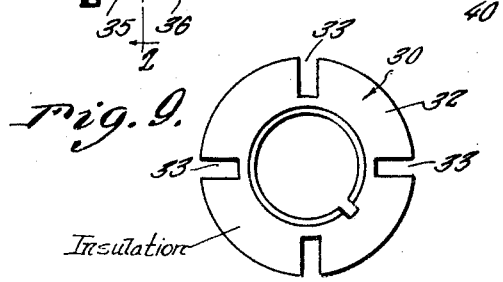
Inventor
Vincente Luis
By Clarence A. O'Brien
Attorney Patented Feb. 10, 1931

1,792,022

UNITED STATES PATENT OFFICE

VINCENTE LUIS, OF ALGIERS, LOUISIANA

ELECTRIC MOTOR

Application filed July 23, 1928. Serial No. 294,788.

The present invention relates to novel improvements in the art of electric motors and the same refers especially to those types of motors employed generally for driving fans and other small utilities.

The invention embodies improvements in both the armature and field arrangement and the same is susceptible of many uses and possesses many objects clearly apparent from the following specification.

Whereas the bar type of commutator may be suitable and particularly adapted for certain electrical devices, this invention aims to eliminate some of the faults inherent in motors, employing such types of commutators. As is known, the bar type of commutator is associated with armature coils divided into what are known as "active" and "effective" quarters, of the armature annulus, the "effective" quarter occurs during the rotation of the armature when certain of the coils thereof are opposed to the respective poles. This "effective" quarter is the coil section of the armature which at the time is effecting the propulsion of the armature. The "active" quarter serves to return the current to the line, after it has passed through the "effective" quarter. This results in the dissipation of a certain amount of the current through the heating of the coils through the "active" quarter. The invention includes the provision of an armature having its coils divided into quarter groups and these being connected in series. Assume that the armature is wound with twelve coils and that coil 12 is starting to oppose one pole, it is obvious that coils 11 and 10 will successively follow in series. The terminal of coil 10 which has the segment connected thereto, that is the segment which receives the current on its return to the line, the current follows the arc of that segment from the center to the negative brush, where it returns back to the line, and it is that part of the segment that takes the place of the active quarter that is hereby eliminated.

In the bar type of commutator, the next succeeding group of coils, namely coils 9, 8 and 7 would serve as the "active" quarter. A four segment commutator inclusive of this invention will be described hereinafter and is employed in lieu of the bar type of commutator whereby the foregoing results are obtained.

By reason of the elimination of the "active" quarter, a reduction in current consumption is attained. This will necessitate an increased resistance in the field and this has been cared for in the provision of a field arrangement particularly adapted for association with this armature.

Among the important objects is the provision of a motor wherein the active phase of the armature coils is restricted consequently resulting in a conservation of current and an increase in power, and wherein the phase of alternating current will render the machine self-starting and will promote the subsequent service running thereof without the interjunction of a speed regulator, boosters or the like.

The motor may be optionally operated by alternating or direct current, without any modification thereof and it can be controlled adequately by resistance interposed in the circuit.

In the drawings:—

Figure 1 represents a perspective view of the armature and commutator structure in assembled relation therewith.

Fig. 2 represents a cross sectional view through the commutator taken substantially on the line 2—2 of Fig. 6.

Fig. 3 is a longitudinal sectional view through the commutator taken substantially on the line 3—3 of Fig. 6.

Fig. 4 is a perspective view of one of the end caps employed in the commutator structure.

Fig. 5 is a perspective view of the commutator core.

Fig. 6 is a side elevational view of the commutator.

Fig. 7 is a perspective view of one of the commutator segments.

Fig. 8 is a perspective view of the nut for securing the commutator in position on the armature shaft.

Fig. 9 is an end elevation of the commutator core.

In the construction of the armature, the body 27 is constructed of a multiplicity of slotted laminations arranged in the cylindrical formation of conventional usage. The coils are wound on this body in substantially the same manner as is customary. A shaft 28 projects beyond each end of the body 27 and secured on the shaft 28 against one end of the body 27 is the commutator structure 29 which forms an important feature of this invention.

This commutator structure includes a short cylindrical core 30 constructed of suitable insulating material and formed with a longitudinal bore 31. Each end of the core is tapered sharply as indicated by 32—32, while a plurality of radially disposed slots 33 are formed longitudinally in the core and at predetermined spaced intervals about the circumference thereof.

As is clearly shown in Figure 3, a conical shaped insulating body 34 is arranged over each tapered end of the core 30 and each of these bodies is provided with a cylindrical flange 35 at its enlarged edge.

Substantially T-shaped segments 36 are adapted for arrangement upon the cylindrical flanges 35 and are provided with inwardly disposed tongues 37 adapted for engagement within the slots 33 of the core. These segments are arranged in a manner to form uninterrupted annulus such as is clearly shown in Figure 8. The projecting portions of the segments inter-engage with each other and are separated from contact by suitable insulating strips 38. A pair of the segments are formed along the outer edge of its elongated portion with a flange 39, while the remaining pair of segments are formed with a flange 40 at the end of the portion projecting at right angles to said elongated portion. Obviously, when the segments are arranged around the core, a continuous flange will be provided.

When the segments have been thus assembled on the core, a cap 41 is applied to each end of the commutator. These caps are each formed centrally with an opening 42, through which the armature shaft projects, while an annular concentric wall 43 is provided around the said opening at one side of the plate and is of a tapered cross section conforming with the space between the conical shaped insulating body 34 and the cylindrical insulating flange 35, so that when the cap is applied to the commutator, the wall 43 will engage within the space. The armature shaft is preferably threaded, as at 44, so that when the caps have been properly positioned in relation to the commutator, the same may be forced against the adjacent end of the armature in the manner shown in Figure 8. A suitable nut 45 may be threaded on the threaded portion 44, and tightly bound against the adjacent cap 41, whereby the component parts of the commutator will be maintained in rigid assembly.

Having described the invention, what is claimed as new is:

1. In an electric motor having an armature shaft, a commutator for disposition on the usual armature shaft, said commutator consisting in construction of a core of insulating material, said core being of cylindrical formation at its intermediate portion with its end portion tapered, conductive segments arranged to form an annulus around the core, a cap for each end of the core, said caps being each formed with an annular wedge protuberance engageable with the tapered end of the core for tightly engaging the core and securing the segment against longitudinal movement on the core.

2. In an electric motor having an armature shaft, a commutator for disposition on the usual armature shaft, said commutator consisting in construction of a core of insulating material, said core being of cylindrical formation at its intermediate portion with its end portion tapered, conductive segments arranged to form an annulus around the core, a cap for each end of the core, said caps being each formed with an annular wedge protuberance engageable with the tapered end of the core for tightly engaging the core and securing the segment against longitudinal movement on the core, for preventing circumferential movement of the segment on the core.

In testimony whereof I affix my signature.

VINCENTE LUIS.